US007015974B2

(12) United States Patent
Lee

(10) Patent No.: US 7,015,974 B2
(45) Date of Patent: Mar. 21, 2006

(54) OSD (ON SCREEN DISPLAY) OBJECT DISPLAY METHOD AND APPARATUS

(75) Inventor: Sung Lyong Lee, Seoul (KR)

(73) Assignee: Samsung Electronics Co., Ltd., (KR)

( * ) Notice: Subject to any disclaimer, the term of this patent is extended or adjusted under 35 U.S.C. 154(b) by 694 days.

(21) Appl. No.: 09/840,023

(22) Filed: Apr. 24, 2001

(65) Prior Publication Data

US 2002/0067430 A1    Jun. 6, 2002

(30) Foreign Application Priority Data

Apr. 24, 2000 (KR) ............................... 2000-21556

(51) Int. Cl.
*H04N 7/00* (2006.01)

(52) U.S. Cl. .................................................. 348/569

(58) Field of Classification Search ............... 348/569, 348/563–567, 568, 714, 468, 553, 600, 461, 348/473, 474; 725/131, 133, 139, 141, 151
See application file for complete search history.

(56) References Cited

U.S. PATENT DOCUMENTS

| 5,598,222 | A | * | 1/1997 | Lane ........................... 348/568 |
| 5,745,837 | A | * | 4/1998 | Fuhrmann .................... 725/114 |
| 5,929,850 | A | * | 7/1999 | Broadwin et al. ........... 725/110 |
| 5,963,266 | A | * | 10/1999 | Fujimori ...................... 348/511 |
| 6,008,836 | A | * | 12/1999 | Bruck et al. ................. 725/131 |
| 6,118,494 | A | * | 9/2000 | Knox et al. .................. 348/569 |
| 6,130,659 | A | * | 10/2000 | Kim et al. .................... 345/112 |
| 6,133,937 | A | * | 10/2000 | Van Gestel .................. 725/114 |
| 6,175,388 | B1 | * | 1/2001 | Knox et al. .................. 348/569 |
| 6,339,451 | B1 | * | 1/2002 | Tults ............................ 348/569 |
| 6,351,292 | B1 | * | 2/2002 | Knox et al. .................. 348/569 |
| 6,424,341 | B1 | * | 7/2002 | Choi ............................ 345/204 |
| 6,460,030 | B1 | * | 10/2002 | Ludtke .......................... 707/3 |
| 6,462,746 | B1 | * | 10/2002 | Min et al. .................... 345/545 |
| 6,504,826 | B1 | * | 1/2003 | Kato et al. ................... 370/312 |
| 6,519,283 | B1 | * | 2/2003 | Cheney et al. .......... 375/240.01 |
| 6,570,626 | B1 | * | 5/2003 | Mendenhall et al. ........ 348/569 |
| 6,591,292 | B1 | * | 7/2003 | Morrison et al. ............ 709/206 |
| 6,593,937 | B1 | * | 7/2003 | Ludtke et al. ............... 345/629 |
| 6,665,020 | B1 | * | 12/2003 | Stahl et al. .................. 348/552 |

OTHER PUBLICATIONS

U.S. Appl. No. 09/252,888, filed Apr. 2002, Inoue et al.*

* cited by examiner

*Primary Examiner*—Paulos M. Natnael
(74) *Attorney, Agent, or Firm*—Sughrue Mion, PLLC

(57) ABSTRACT

An OSD object display apparatus and a method therefor are provided, wherein an OSD source transmits OSD display data to a display apparatus by giving each peculiar ID in at least more than one OSD object unit, said display apparatus stores at least more than one received OSD object display data in a memory, said OSD source transmits OSD object ID and display location information thereof to said display apparatus, and said display apparatus displays a corresponding OSD object display data stored in said memory in response to the received OSD object ID and display location information. Therefore, an OSD object can be displayed smoothly by reducing the amount of transmitted data and increasing the processing speed, because only OSD display data is transmitted, initially, by giving ID in at least more than one OSD object unit, and only OSD object ID and display location information are transmitted thereafter.

8 Claims, 3 Drawing Sheets

OSD (ON SCREEN DISPLAY) OBJECT DISPLAY METHOD AND APPARATUS

BACKGROUND OF THE INVENTION

1. Field of the Invention

The present invention relates to an OSD object display method and an OSD object display apparatus, particularly to a method and an apparatus which can display an OSD object smoothly, because the amount of data in transmission is reduced and the data processing time becomes faster, since only OSD display data is transmitted by giving ID in at least more than one OSD object unit in early stages, and only OSD object ID and display location information are transmitted from an OSD source to a display apparatus thereafter. The present application is based on Korean Patent Application No. 2000-21556, which is incorporated herein by reference.

2. Description of the Related Art

A digital television (DTV) is provided which displays on a screen not only a digital television image signal received through its own tuner, but also image information from various sources. That is, DTV, for example, is provided with a satellite television signal provided from a satellite through a satellite broadcast receiver, such as a set top box (STB), an image signal reproduced from a digital video disc (DVD) player, and an image signal reproduced from a digital video cassette recorder (DVCR) through an IEEE 1394 bus. The DTV 1394 interface standard is specified in the EIA-775 standard series. Here, a source providing an image signal is defined as a producer, and an apparatus receiving and displaying an image signal like DTV is defined as a consumer. In the DTV 1394 standard, an image signal is provided to a consumer in an MPEG transport stream, and OSD data is provided to a consumer in a bitmap format. Also, a producer and a consumer exchange a control signal and a state signal.

In general, a producer and a consumer each adopt a separate remote controller for a user interface. Therefore, the user interface of a consumer is made to interactively control the consumer while displaying in an OSD screen through a remote controller. But, although a producer is made to interactively control the producer while displaying in an OSD screen through a remote controller, the OSD screen is actually displayed through a DTV. Therefore, if the amount of OSD data transmitted between the producer and the consumer is large, by receiving OSD data of the producer in the consumer, an adaptive display of a displayed screen becomes difficult, according to the excessive amount of processed data for displaying. That is, the change and movement of an image can be unnatural enough for a viewer to visually observe. This phenomenon acts to reduce the value of a product.

Particularly, a smooth operation of an OSD screen becomes more important in evaluating the value of a product, as the user interface of the product becomes more convenient and the function becomes more diverse.

SUMMARY OF THE INVENTION

The present invention has been completed in view of the above-described problems involved in the prior art, and it is an object of the present invention to provide an OSD cursor display method and an OSD image display apparatus which can display OSD display data provided from an OSD source faster and more smoothly in a display apparatus, by transmitting the OSD display data by giving ID in an object unit in early stages, and thereafter transmitting only object ID and display location information.

According to one aspect of the present invention, the method of the present invention comprises the steps of: transmitting OSD display data by giving each peculiar ID in at least more than one OSD object unit in an OSD source; storing OSD display data of at least more than one OSD object unit received in said display apparatus in a memory; transmitting only ID and display location information of an OSD object to said display apparatus in said OSD source; and reading OSD object display data having a corresponding ID from said memory and displaying the OSD object display data on a screen in response to the ID and the display location information of the OSD object received in said display apparatus.

According to another aspect of the present invention, the apparatus of the present invention comprises an OSD source remote controller for generating an OSD object display command on a screen; an OSD source which transmits OSD display data by giving each peculiar ID in at least more than one OSD object unit, and transmits an OSD object ID and display location information if there is an OSD object display command from said OSD source remote controller; and a display apparatus for storing at least more than one OSD object display data received from said OSD source in a memory and reading OSD object display data having a corresponding ID from the memory in response to the received OSD object ID and display location information, and displaying the OSD object display data on a screen.

According to the present invention, the representation of a game, etc., can be performed smoothly because various OSD objects can be displayed very fast by transmitting an ID of an OSD object and display location information, rather than by transmitting a large amount of OSD display data in bitmap format every time between a producer and a consumer.

BRIEF DESCRIPTION OF THE DRAWINGS

Further objects and advantages of the invention can be more fully understood from the following detailed description taken in conjunction with the accompanying drawings in which.

DETAILED DESCRIPTION OF PREFERRED EMBODIMENTS

The present invention will hereinafter be described in detail through one embodiment of the present invention, with reference to the accompanying drawings.

Figure 1:
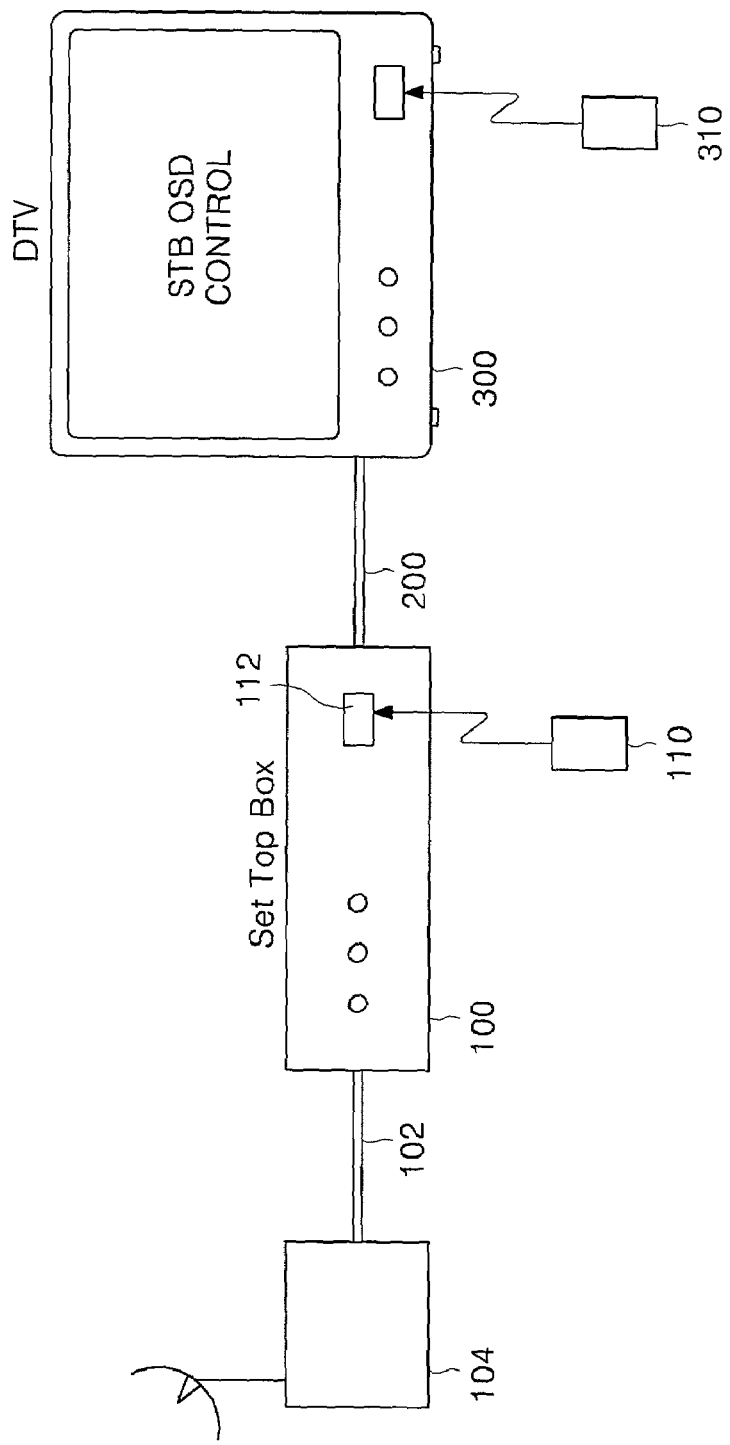
FIG. 1 is a drawing showing one embodiment of an OSD object display apparatus according to the present invention.

FIG. 1 shows one embodiment of an OSD object display apparatus according to the present invention.

A set top box 100 and a producer receive a digital satellite broadcast signal provided from a satellite through a satellite antenna 104 connected through a coaxial cable 102. The set top box 100 detects an MPEG transport stream from the received satellite broadcast signal and then provides the detected MPEG transport stream to a DTV 300 through a DTV 1394 bus 200.

The set top box 100 inputs a command generated through a remote controller 110 through a remote controller receiving part 112. Corresponding OSD data is generated in response to the inputted command and is provided to the DTV 300 through the DTV 1394 bus 200.

The DTV 300 recovers an image signal by decoding the received MPEG transport stream through an MPEG decoder, and displays on a screen by overlapping the recovered image signal and the received OSD data. Therefore, a user can control an STB 100 while viewing an OSD screen of the STB displayed on a screen of the DTV by using the remote controller for set top box.

The DTV 300 is controlled through a DTV remote controller 310.

Figure 2:
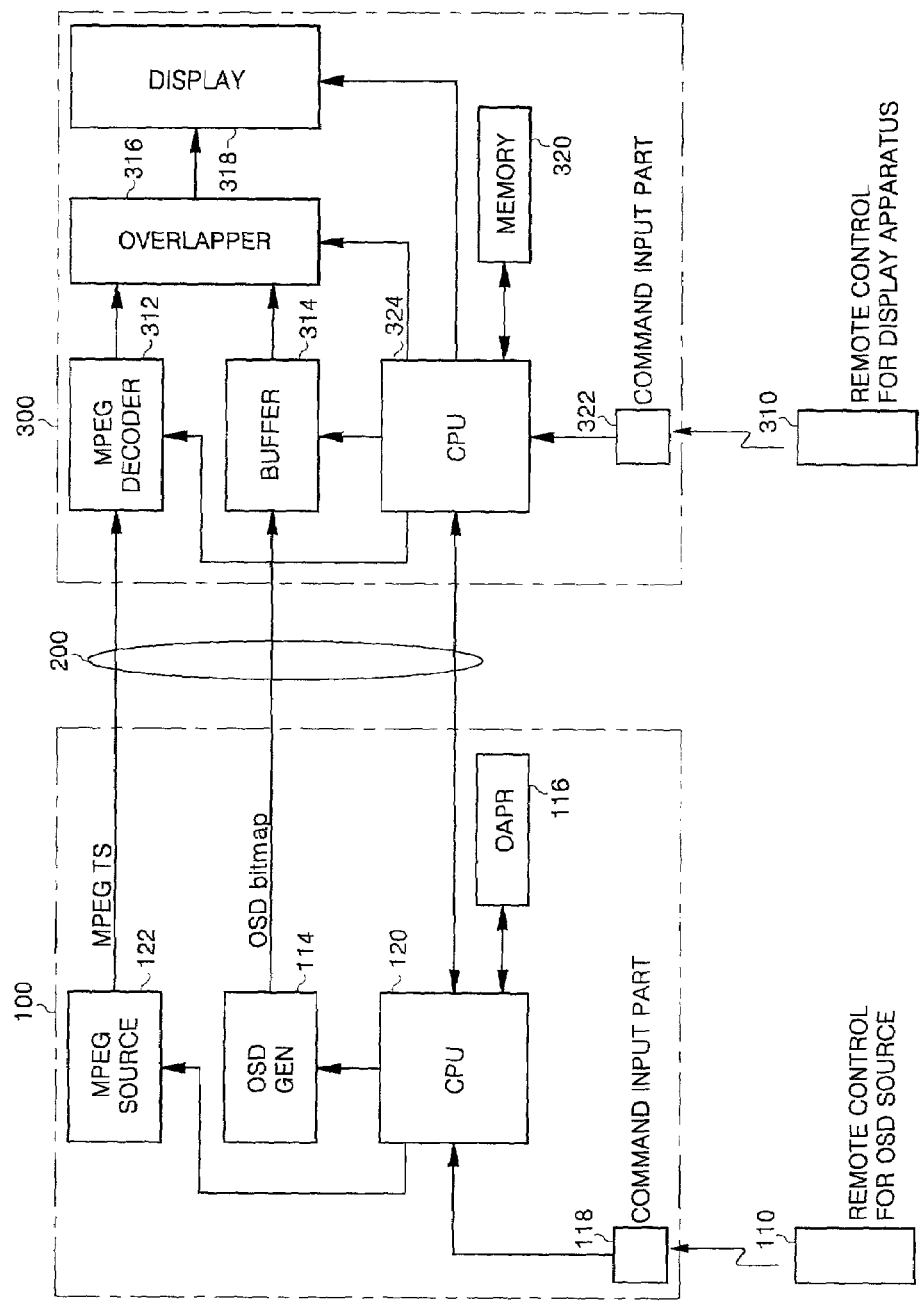
FIG. 2 is a circuit block diagram to illustrate the operation of FIG. 1.

FIG. 2 shows a circuit block diagram to illustrate the operation of FIG.

The set top box 100 and the DTV 300 are interconnected with a DTV 1394 bus 200.

The set top box 100 includes an MPEG source 112, an OSD generator 114, an output asynchronous plug register 116, a command input part 118 and a control part 120. The command input part 118 receives a command signal generated by the remote controller 110 and provides the command signal to the control part 120. The MPEG source detects an MPEG transport stream by inputting a satellite broadcast signal in response to the control of the control part 120 and provides the detected MPEG transport stream to the DTV 300. The OSD generator 114 generates OSD display data in bitmap format in response to the control of the control part 120.

Figure 3:
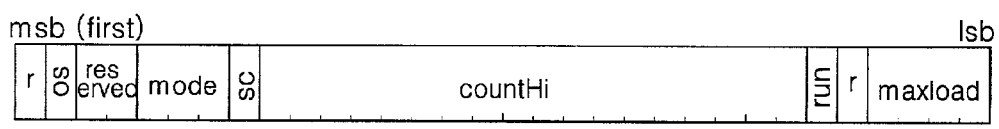
FIG. 3 is a drawing showing data structure of an output asynchronous plug register (OAPR) of a producer according to the present invention.

The output asynchronous plug register (OAPR) 116 stores four bytes of data as shown in FIG. 3. The data structure of the output asynchronous plug register (OAPR) in FIG. 3 is as shown in Table 1.

TABLE 1

| CLASSIFICATION | DESCRIPTION |
| --- | --- |
| RESERVED | 0 |
| OS | BIT INDICATING POSSIBILITY OF OBJECT DATA SAVE |
| RESERVED | 0 |
| MODE | 0: FREE, 1: RESERVED, 2: SUSPEND 3: RESERVED, 4: RESUME 5: SEND, 6~7: RESERVED, |
| SC | TOGGLE BIT |
| COUNTHi | 18 BITS COUNT VALUE |
| RUN | |
| RESERVED | 0 |
| MAX LOAD | INDICATE DATA-PAYLOAD SIZE FOR ENTERING 4 BITS SEGMENT BUFFER |

According to the present invention, the output asynchronous plug register (OAPR) information is provided from the DTV to the STB in initial connection of the STB 100 and the DTV 300. Then, in case of a DTV having an own OSD object data save possibility indicating data, if the OSD object data save possibility information is provided to the STB 100, the STB sets the OS bit of cursor data save possibility indicating bit as "1".

According to the present invention, in case of displaying the OSD display data by transmitting from the STB 100 to the DTV 300, initially, all OSD display data are classified by ID in an object unit and then transmitted. Thereafter, only the OSD object ID and display location information are transmitted.

The DTV 300 includes an MPEG decoder 312, a buffer 314, an overlapper 316, an image display 318, a memory 320, a command input part 322 and a control part 324. The MPEG decoder 312 outputs image data to the overlapper 316 by extending a compression-coded image data, by inputting an MPEG transport stream. The buffer 314 buffers the provided OSD data and provides the corresponding OSD data to the overlapper 316 in response to the control of the control part 324. The overlapper 316 overlaps the image data and the OSD data and provides this overlapped data to the image display 318. The memory 320 stores the OSD display data provided from the STB 100. The command input part 322 receives a command signal generated from the remote controller 310 and provides the command signal to the control part 324.

In the display apparatus, the provided OSD display data is classified by OSD object ID and is stored. Therefore, an OSD object corresponding to the next provided OSD object ID and display location information is read from the memory and is displayed on a screen.

Figure 4:
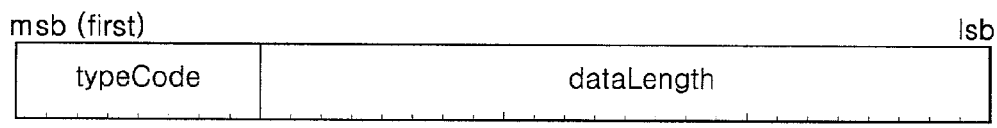
FIG. 4 is a drawing showing a sub frame structure of OSD object data according to the present invention.

The STB 100 generates and transmits an OSD object data sub frame, as shown in FIG. 4, first by controlling the OSD generator 114 through the control part 120 if an OSD cursor display command is inputted through the remote controller 110.

The OSD object data sub frame in FIG. 4 is constituted with TYPECODE of one byte, data length of three bytes and object data of plural bytes. The TYPECODE, for example, has a series of different code values of "0XE1", "0XE2", . . . Here, "0X" of "0XE1" indicates HEXA CODE. Therefore, "E1" indicates a value of HEXA CODE.

In the DTV 300, plural OSD objects are stored in a memory according to TYPECODE.

Figure 5:
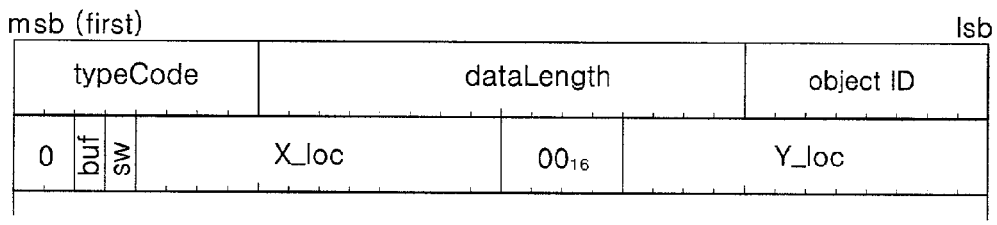
FIG. 5 is a drawing showing an OSD ID sub frame structure transmitted from a producer to a consumer according to the present invention.

An OSD ID sub frame in FIG. 5 includes TYPECODE of one byte, data length of two bytes, an object ID of one byte, BUF of one bit, SW of one bit, 12 bits X coordinate value of cursor display location and 12 bits Y coordinate value of a cursor. TYPECODE of the OSD ID sub frame is set as "0XE0". The object ID has ID of corresponding object data, that is, values of "0XE1, 0XE2, . . . " of TYPECODE of the OSD object data sub frame. The data length is constituted with 5 bytes. BUF has "0" value and SW has "0" value. "00" of BUF and SW is a control code for locating cursor display data in the buffer 314 promptly in the consumer.

Therefore, the DTV 300 analyzes the sub frame in FIG. 5 received in the buffer 314, and if the TYPECODE value is "0XE0", reads an object having the same TYPECODE as the object ID from the memory 320 and displays the object on a given XY coordinate system.

Therefore, according to the present invention, the STB 100 does not send the whole OSD display data in bitmap format every time to the DTV 300. The STB 100 sends the whole OSD display data by giving an ID in an object unit in early stages, and thereafter, sending only an OSD object ID and display location information. Then, the DTV 300 reads an OSD object having a corresponding ID and displays it on a given location on the screen. Therefore, because the amount of data reception and transmission between the STB 100 and the DTV 300 is largely reduced, OSD display on the screen can be performed very fast, and, thus, it can be viewed very naturally by a user.

Particularly, it can be very effectual in displaying animation on a screen, like a game.

According to the present invention, as noted above, the representation of a game, etc., can be performed smoothly, because various OSD objects can be displayed very fast by transmitting an ID of an OSD object and display location information, not by transmitting a large amount of OSD display data in bitmap format every time between a producer and a consumer.

While the present invention has been described with respect to the particular embodiments, it will be apparent to those skilled in the art that various changes and modifications may be made without departing from the spirit and scope of the invention as defined in the following claims.

What is claimed is:

1. An OSD display method, comprising the steps of:
   transmitting OSD display data to a display apparatus from an OSD source by giving each OSD display data a peculiar ID in at least more than one OSD object unit;
   storing received OSD display data in at least more than one OSD object unit in a memory in said display apparatus;
   transmitting ID and display location information of an OSD object, without transmitting any of the OSD display data, to said display apparatus from said OSD source;
   reading OSD object display data having a corresponding ID from said memory; and
   displaying the OSD object display data on a screen in response to the corresponding ID and the display location information of the OSD object.

2. An OSD object display apparatus, comprising:
   an OSD source remote controller for generating an OSD object display command on a screen;
   an OSD source for transmitting OSD display data by giving each OSD display data a peculiar ID in at least more than one OSD object unit and transmitting an OSD object ID and display location information, without transmitting any of the OSD display data, if there is an OSD object display command from said OSD source remote controller; and
   a display apparatus for storing at least more than one OSD object display data received from said OSD source in a memory, reading OSD object display data having a corresponding ID from the memory in response to received OSD object ID and display location information, and displaying OSD object display data on a screen.

3. The OSD object display apparatus of claim 2, wherein the OSD source comprises:
   an MPEG source for supplying a detected MPEG transport stream to the display apparatus;
   an OSD generator for generating OSD display data in bitmap format;
   a register for storing data; and
   a controller for controlling the MPEG source, the OSD generator, and the register.

4. The OSD object display apparatus according to claim 3, wherein the register is an output asynchronous plug register.

5. The OSD object display apparatus according to claim 3, wherein the OSD source further comprises:
   a command input part for receiving a command signal from the OSD source remote controller and providing the command signal to the controller.

6. The OSD object display apparatus of claim 2, wherein the display apparatus comprises:
   an MPEG decoder for decoding an MPEG transport stream and outputting image data;
   a buffer for buffering OSD data;
   an overlapper for overlapping the image data and the OSD data and providing overlapped data to the screen; and
   a controller for controlling the MPEG decoder, the buffer, the overlapper, the memory, and the screen.

7. The OSD object display apparatus according to claim 6, wherein the OSD object display apparatus further comprises:
   a display apparatus remote controller.

8. The OSD object display apparatus according to claim 7, wherein the display apparatus further comprises:
   a command input part for receiving a command signal from the display apparatus remote controller and providing the command signal to the controller.

* * * * *